(12) United States Patent
Takefman et al.

(10) Patent No.: US 12,204,486 B2
(45) Date of Patent: Jan. 21, 2025

(54) NETWORK TRANSCEIVER WITH CLOCK SHARING BETWEEN DIES

(71) Applicant: Marvell Asia Pte Ltd, Singapore (SG)

(72) Inventors: Michael Lewis Takefman, Nepean (CA); Arash Farhoodfar, Milpitas, CA (US); Srinivas Swaminathan, San Jose, CA (US); Belal Helal, Santa Clara, CA (US)

(73) Assignee: Marvell Asia Pte Ltd, Singapore (SG)

( * ) Notice: Subject to any disclaimer, the term of this patent is extended or adjusted under 35 U.S.C. 154(b) by 105 days.

(21) Appl. No.: 18/063,479

(22) Filed: Dec. 8, 2022

(65) Prior Publication Data
US 2023/0185757 A1    Jun. 15, 2023

Related U.S. Application Data

(60) Provisional application No. 63/287,916, filed on Dec. 9, 2021.

(51) Int. Cl.
*G06F 13/42* (2006.01)
*H04B 1/04* (2006.01)
*H04B 1/38* (2015.01)

(52) U.S. Cl.
CPC ....... *G06F 13/4291* (2013.01); *H04B 1/0483* (2013.01); *H04B 1/38* (2013.01)

(58) Field of Classification Search
CPC .................................................. G11C 13/0069
See application file for complete search history.

(56) References Cited

U.S. PATENT DOCUMENTS

| | | | |
|---|---|---|---|
| 9,003,221 B1* | 4/2015 | Abugharbieh | G01R 31/31725 713/401 |
| 9,306,730 B1 | 4/2016 | Shu et al. | |
| 2017/0272231 A1* | 9/2017 | Chen | H04L 25/14 |
| 2021/0028788 A1 | 1/2021 | Xu et al. | |
| 2021/0297082 A1* | 9/2021 | Wolkovitz | H03L 7/0802 |

OTHER PUBLICATIONS

Nandwana, R.K., et al., "29.6 A 3-to-10Gb/s 5.75pJ/b Transceiver with Flexible Clocking in 65nm CMOS," *IEEE International Solid-State Circuits Conference (ISSCC)*, pp. 492-494 (2017).

\* cited by examiner

*Primary Examiner* — Henry Tsai
*Assistant Examiner* — Juanito C Borromeo

(57) ABSTRACT

A multi-lane integrated circuit transceiver device includes first and second integrated circuit dies having respective first and second pluralities of transmit block/receive block pairs. Each respective transmit block and each respective receive block in the first plurality of block pairs on the first die and the second plurality of block pairs on the second die includes respective digital clock generation circuitry. The device further includes digital clock distribution circuitry to distribute a digital clock signal output by one respective receive block, in one of the first and second pluralities of block pairs, to the transmit blocks in both of the pluralities of block pairs, for use as a baseline clock by the respective digital clock generation circuitry in each of the transmit blocks in both of the pluralities of block pairs. Where each plurality includes N block pairs, the two dies together form a single 2N-lane device.

26 Claims, 9 Drawing Sheets

NETWORK TRANSCEIVER WITH CLOCK SHARING BETWEEN DIES

CROSS REFERENCE TO RELATED APPLICATION

This disclosure claims the benefit of commonly-assigned U.S. Provisional Patent Application No. 63/287,916, filed Dec. 9, 2021, which is hereby incorporated by reference herein in its entirety.

FIELD OF USE

This disclosure relates to clock sharing between dies in a network transceiver device. More particularly, this disclosure relates to digital clock sharing between multiple integrated circuit dies in an Ethernet physical layer transceiver or network switch.

BACKGROUND

The background description provided herein is for the purpose of generally presenting the context of the disclosure. Work of the inventor hereof, to the extent the work is described in this background section, as well as aspects of the description that may not otherwise qualify as prior art at the time of filing, are neither expressly nor impliedly admitted to be prior art against the subject matter of the present disclosure.

In a multi-port or multi-lane networking device, such as a multi-port Ethernet switch or, on a smaller scale, a multi-lane physical layer transceiver (PHY), the various ports or lanes may be spread across two or more dies. In some cases, the two dies may be configured as a single multi-lane port, but if the two dies are from different wafers, or even different areas of the same wafer, process variations may result in significant clock skew between lanes.

SUMMARY

In accordance with implementations of the subject matter of this disclosure, a multi-lane integrated circuit transceiver device includes a first integrated circuit die having a first plurality of transmit block/receive block pairs, and a second integrated circuit die having a second plurality of transmit block/receive block pairs. Each respective transmit block and each respective receive block in (A) the first plurality of transmit block/receive block pairs on the first integrated circuit die and (B) the second plurality of transmit block/receive block pairs on the second integrated circuit die includes respective digital clock generation circuitry. The multi-lane transceiver device further includes digital clock distribution circuitry configured to distribute a digital clock signal output by one respective receive block, in one plurality among (a) the first plurality of transmit block/receive block pairs on the first integrated circuit die and (b) the second plurality of transmit block/receive block pairs on the second integrated circuit die, to the transmit blocks in both (1) the first plurality of transmit block/receive block pairs on the first integrated circuit die and (2) the second plurality of transmit block/receive block pairs on the second integrated circuit die, for use as a baseline clock by the respective digital clock generation circuitry in each of the transmit blocks in both (i) the first plurality of transmit block/receive block pairs on the first integrated circuit die and (ii) the second plurality of transmit block/receive block pairs on the second integrated circuit die.

In a first implementation of such a multi-lane integrated circuit transceiver device, the first plurality of transmit block/receive block pairs on the first integrated circuit die includes N transmit block/receive block pairs, the second plurality of transmit block/receive block pairs on the second integrated circuit die includes N transmit block/receive block pairs, and the multi-lane integrated circuit transceiver device includes 2N lanes.

According to a first aspect of that implementation, the first integrated circuit die is a primary integrated circuit die having no more than N transmit block/receive block pairs configured to form a first group of transmit block/receive block pairs, the second integrated circuit die is a secondary integrated circuit die having no more than N transmit block/receive block pairs configured to form a second group of transmit block/receive block pairs, the digital clock distribution circuitry includes buffer circuitry on the first integrated circuit die and the second integrated circuit die configured to transmit the digital clock signal output by the one respective receive block off of the first integrated circuit die and onto both the first integrated circuit die and the second integrated circuit die, and the first integrated circuit die and the second integrated circuit die together form a single 2N-lane transceiver.

According to a first aspect of that implementation, the first integrated circuit die and the second integrated circuit die are identical, each having 2N transmit block/receive block pairs, the digital clock distribution circuitry includes buffer circuitry on the first integrated circuit die and the second integrated circuit die configured to transmit the digital clock signal, output by a first respective receive block, off of one of the first integrated circuit die and the second integrated circuit die, and onto both the first integrated circuit die and the second integrated circuit die, for sharing by a first group of transmit block/receive block pairs including N transmit block/receive block pairs on the first integrated circuit die and N transmit block/receive block pairs on the second integrated circuit die, and to transmit the digital clock signal, output by a second respective receive block, off one of the first integrated circuit die and the second integrated circuit die, and onto both the first integrated circuit die and the second integrated circuit die, for sharing by a second group of transmit block/receive block pairs including N transmit block/receive block pairs on the first integrated circuit die and N transmit block/receive block pairs on the second integrated circuit die, and the first group of transmit block/receive block pairs including N transmit block/receive block pairs on the first integrated circuit die and N transmit block/receive block pairs on the second integrated circuit die forms a first 2N-lane transceiver, and the second group of transmit block/receive block pairs including N transmit block/receive block pairs on the first integrated circuit die and N transmit block/receive block pairs on the second integrated circuit die form a second 2N-lane transceiver.

In a second implementation of such a multi-lane integrated circuit transceiver device, the respective digital clock generation circuitry includes digitally-controlled oscillator circuitry, and digital control circuitry configured to compare output of the digital clock generation circuitry to the baseline clock, and to output digital control signals to control the digitally-controlled oscillator circuitry.

According to a first aspect of that second implementation, the digital control circuitry is a digital loop control circuit including a digital phase detector and a digital loop filter.

In a first instance of that first aspect, the digitally-controlled oscillator circuitry includes analog phase-locked loop circuitry including, in series, a phase detector, a charge pump, a loop filter and an oscillator, and further including a feedback divider through which output of the oscillator is fed back to a first input of the phase detector, the phase detector having a second input configured to receive a reference clock signal, and a fractional modulator that controls a divisor of the feedback divider.

In a first occurrence of that first instance, the fractional modulator is a delta-sigma modulator.

In a first occurrence of that first instance, the digital control circuitry is configured to output digital control signals for the fractional modulator to dynamically control the divisor of the feedback divider.

In a first instance of that first aspect, the digital phase detector is a Bang-Bang phase detector.

In accordance with implementations of the subject matter of this disclosure, a method of forming a multi-lane integrated circuit transceiver device including (A) a first integrated circuit die having a first plurality of transmit block/receive block pairs, and (B) a second integrated circuit die having a second plurality of transmit block/receive block pairs, each respective transmit block and each respective receive block in the (I) first plurality of transmit block/receive block pairs on the first integrated circuit die, and (II) the second plurality of transmit block/receive block pairs on the second integrated circuit die, including respective digital clock generation circuitry, includes configuring one respective receive block, in one plurality among (a) the first plurality of transmit block/receive block pairs on the first integrated circuit die and (b) the second plurality of transmit block/receive block pairs on the second integrated circuit die, to output a digital clock signal, and configuring circuitry to distribute the digital clock signal to the transmit blocks in both (1) the first plurality of transmit block/receive block pairs on the first integrated circuit die and (2) the second plurality of transmit block/receive block pairs on the second integrated circuit die, for use as a baseline clock by the respective digital clock generation circuitry in each of the transmit blocks in both (i) the first plurality of transmit block/receive block pairs on the first integrated circuit die and (ii) the second plurality of transmit block/receive block pairs on the second integrated circuit die.

A first implementation of such a method further includes combining the N transmit block/receive block pairs on the first integrated circuit die and the N transmit block/receive block pairs on the second integrated circuit die to form a multi-lane integrated circuit transceiver device having 2N lanes.

A first aspect of that first implementation includes configuring the first integrated circuit die as a primary integrated circuit die having no more than N transmit block/receive block pairs forming a first group of transmit block/receive block pairs, configuring the second integrated circuit die as a secondary integrated circuit die having no more than N transmit block/receive block pairs forming a second group of transmit block/receive block pairs, and configuring the digital clock distribution circuitry to transmit the digital clock signal output by the one respective receive block off the first integrated circuit die and onto both the first integrated circuit die and the second integrated circuit die, so that the first integrated circuit die and the second integrated circuit die together form a single 2N-lane transceiver.

A second aspect of that first implementation includes configuring the digital clock distribution circuitry on the first integrated circuit die and the second integrated circuit die to transmit the digital clock signal output by a first respective receive block off one of the first integrated circuit die and the second integrated circuit die, and onto both the first integrated circuit die and the second integrated circuit die, for sharing by a first group of transmit block/receive block pairs including N transmit block/receive block pairs on the first integrated circuit die and N transmit block/receive block pairs on the second integrated circuit die, and to transmit the digital clock signal output by a second respective receive block off one of the first integrated circuit die and the second integrated circuit die, and onto both the first integrated circuit die and the second integrated circuit die, for sharing by a second group of transmit block/receive block pairs including N transmit block/receive block pairs on the first integrated circuit die and N transmit block/receive block pairs on the second integrated circuit die. The first group of transmit block/receive block pairs includes N transmit block/receive block pairs on the first integrated circuit die and N transmit block/receive block pairs on the second integrated circuit die forms a first 2N-lane transceiver, and the second group of transmit block/receive block pairs including N transmit block/receive block pairs on the first integrated circuit die and N transmit block/receive block pairs on the second integrated circuit die forms a second 2N-lane transceiver.

A second implementation of such a method further includes configuring the respective digital clock generation circuitry to include digitally-controlled oscillator circuitry, and digital control circuitry configured to compare output of the digital clock generation circuitry to the baseline clock, and to output digital control signals to control the digitally-controlled oscillator circuitry.

According to a first aspect of that second implementation, configuring the respective digital clock generation circuitry to include digital control circuitry includes configuring a digital loop control circuit including a digital phase detector and a digital loop filter.

In a first instance of that first aspect, configuring the respective digital clock generation circuitry to include digitally-controlled oscillator circuitry includes configuring analog phase-locked loop circuitry including, in series, a phase detector, a charge pump, a loop filter and an oscillator, and further including a feedback divider through which output of the oscillator is fed back to a first input of the phase detector, the phase detector having a second input configured to receive a reference clock signal, and configuring a fractional modulator that controls a divisor of the feedback divider.

In a first occurrence of that first instance, configuring the fractional modulator includes configuring a delta-sigma modulator.

In a second occurrence of that first instance, configuring the digital control circuitry includes configuring the digital control circuitry to output digital control signals for the fractional modulator to dynamically control the divisor of the feedback divider.

In accordance with implementations of the subject matter of this disclosure, a method of clocking a multi-lane integrated circuit transceiver device including (A) a first integrated circuit die having a first plurality of transmit block/receive block pairs, and (B) a second integrated circuit die having a second plurality of transmit block/receive block pairs, each respective transmit block and each respective receive block in (I) the first plurality of transmit block/receive block pairs on the first integrated circuit die, and (II) the second plurality of transmit block/receive block pairs on the second integrated circuit die, including respective digital clock generation circuitry, includes outputting a digital clock signal from one respective receive block, in one plurality among (a) the first plurality of transmit block/receive block pairs on the first integrated circuit die and (b) the second plurality of transmit block/receive block pairs on the second integrated circuit die, and distributing the digital clock signal to the transmit blocks in both (1) the first plurality of transmit block/receive block pairs on the first integrated circuit die and (2) the second plurality of transmit block/receive block pairs on the second integrated circuit die, for use as a baseline clock by the respective digital clock generation circuitry in each of the transmit blocks in both (i) the first plurality of transmit block/receive block pairs on the first integrated circuit die and (ii) the second plurality of transmit block/receive block pairs on the second integrated circuit die.

A first implementation of such a method further include combining the N transmit block/receive block pairs on the first integrated circuit die and the N transmit block/receive block pairs on the second integrated circuit die to form a multi-lane integrated circuit transceiver device having 2N lanes.

A first aspect of that first implementation includes operating the first integrated circuit die as a primary integrated circuit die having no more than N transmit block/receive block pairs forming a first group of transmit block/receive block pairs, operating the second integrated circuit die as a secondary integrated circuit die having no more than N transmit block/receive block pairs forming a second group of transmit block/receive block pairs, and transmitting the digital clock signal output by the one respective receive block via the digital clock distribution circuitry off the first integrated circuit die and onto both the first integrated circuit die and the second integrated circuit die, so that the first integrated circuit die and the second integrated circuit die together form a single 2N-lane transceiver.

A second aspect of that first implementation, where the first integrated circuit die and the second integrated circuit die are identical, each having 2N transmit block/receive block pairs, includes transmitting the digital clock distribution circuitry on the first integrated circuit die and the second integrated circuit die to transmitting the digital clock signal output by a first respective receive block, the digital clock distribution circuitry on the first integrated circuit die and the second integrated circuit die, off one of the first integrated circuit die and the second integrated circuit die, and onto both the first integrated circuit die and the second integrated circuit die, for sharing by a first group of transmit block/receive block pairs including N transmit block/receive block pairs on the first integrated circuit die and N transmit block/receive block pairs on the second integrated circuit die, and transmitting the digital clock signal output by a second respective receive block, via the digital clock distribution circuitry on the first integrated circuit die and the second integrated circuit die, off one of the first integrated circuit die and the second integrated circuit die, and onto both the first integrated circuit die and the second integrated circuit die, for sharing by a second group of transmit block/receive block pairs including N transmit block/receive block pairs on the first integrated circuit die and N transmit block/receive block pairs on the second integrated circuit die; wherein: the first group of transmit block/receive block pairs including N transmit block/receive block pairs on the first integrated circuit die and N transmit block/receive block pairs on the second integrated circuit die forms a first 2N-lane transceiver, and the second group of transmit block/receive block pairs including N transmit block/receive block pairs on the first integrated circuit die and N transmit block/receive block pairs on the second integrated circuit die form a second 2N-lane transceiver.

A second implementation of such a method, where the respective digital clock generation circuitry includes oscillator circuitry, includes comparing, in digital control circuitry, output of the digital clock generation circuitry to the baseline clock, and outputting, from the digital control circuitry, digital control signals to control the oscillator circuitry.

According to a first aspect of that second implementation, where the oscillator circuitry includes analog phase-locked loop circuitry including, in series, a phase detector, a charge pump, a loop filter and an oscillator, and further includes a feedback divider, and a fractional modulator that controls a divisor of the feedback divider, outputting, from the digital control circuitry, digital control signals to control the oscillator circuitry includes outputting, from the digital control circuitry, digital control signals to control the fractional modulator.

In a first instance of that first aspect, outputting, from the digital control circuitry, control signals to control the fractional modulator, includes outputting, from the digital control circuitry, control signals for the fractional modulator to dynamically control the divisor of the feedback divider.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which.

DETAILED DESCRIPTION

Figure 1:
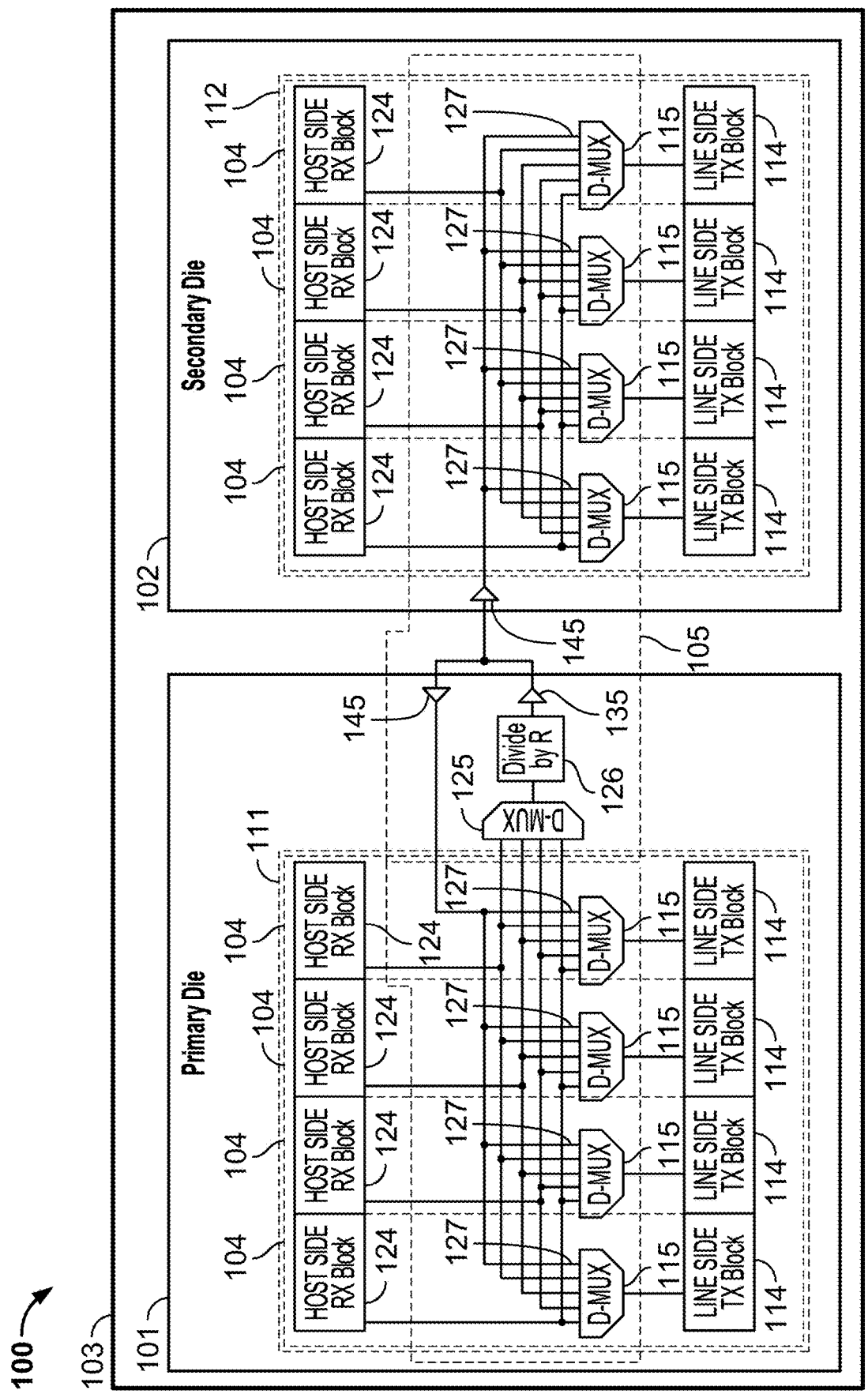
FIG. 1 is a schematic representation of a transceiver device, including two separate dies in a single package, incorporating a first implementation of the subject matter of this disclosure.

As described above, in a multi-port or multi-lane networking device, such as a multi-port Ethernet switch or, on a smaller scale, a multi-lane physical layer transceiver (PHY), including a plurality of transmitter/receiver pairs. The various ports or lanes may be spread across two or more dies. In some cases, the two dies may be configured as a single multi-lane port, but if the two dies are from different wafers, or even different areas of the same wafer, process variations may result in significant clock skew between lanes.

One way of reducing the skew is to have all transmit blocks share a single one of the receive block clocks as a timing baseline. However, the clocks are typically generated by an analog phase-locked loop (PLL), and analog clock transfer from one die to another substantially increases power consumption and clock jitter, and also increases design/manufacturing cost.

Therefore, in accordance with implementations of the subject matter of this disclosure, digital circuitry—i.e., circuitry constructed from digital logic gates, configured to process digital signals (as compared to analog circuitry, which is constructed from various components, such as resistors, capacitors and inductors, etc. and is configured to process analog signals)—is used to share one of the receive clocks from one die to another die, and to generate respective transmit clocks from that one of the receive clocks, substantially reducing power consumption, as well as design/manufacturing cost.

Each transmit block includes digital clock generation circuitry. In some implementations, the digital clock generation circuitry includes a digital control circuit and a digitally-controlled oscillator. For example, the digital control circuit of such an implementation may be a frequency-locked loop (FLL) controller, while the digitally-controlled oscillator may be an analog PLL with a digitally-controlled feedback modulator, as described below. One of the receive blocks provides its output clock (which may be generated by clock recovery from the received data, using a local reference clock as a "startup" clock) as a baseline to the digital clock generation circuitry in each transmit block. The baseline clock is provided as one input to the digital control portion of the digital clock generation circuitry. The output of the digital clock generation circuitry is provided as another input to the digital control portion of the digital clock generation circuitry.

The digital control portion of the digital clock generation circuitry provides a digital control word to adjust the digitally-controlled oscillator, as described below, to try to lock the digital clock generation circuitry output to the baseline clock provided by the receive block.

Further, to minimize skew, the paths of the baseline receive clock, from its source in one of the receive blocks to each of the transmit blocks that are sharing the baseline clock, should be the same electrically (i.e., in terms of the devices it traverses) and should have substantially the same length. Therefore, on each die, even though digital multiplexers may be provided allowing any transmit block on the die to accept a receive clock from any receive block on the die, when the receive clock is to be shared across dies, the receive clock is selected by a digital multiplexer from among all receive clocks on the source, or "primary," die, and propagated off the primary die, both to at least one other "secondary" die, as well as back onto the primary die. The receive clock is then routed to each transmit block that will use the receive clock as a baseline, whether that transmit block is on the primary die where the receive clock originated, or on the secondary die. That way, the shared receive clock traverses the similar devices (e.g., the same number of multiplexers, buffers, etc.), and similar distances, from the source receive block to all destination transmit blocks.

In some simpler implementations, each primary die in a first group of dies in the networking device may be capable of sharing receive clocks with transmit blocks on other dies, while each secondary die in a second group of dies in the networking device may be capable only of accepting receive clocks from a primary die in the first group of dies. Each of the first and second groups of dies may include as few as one die each, but each also may include a plurality of dies.

Within both groups of dies in such simpler implementations, each die includes circuitry for distribution of the shared receive clock to transmit blocks on that die.

Specifically, within the first group of dies, each primary die includes a digital multiplexer for selecting a receive clock that is output by one of the receive blocks on that primary die, and for routing the receive clock off the primary die via an output buffer, and also includes an input buffer through with the selected clock may be routed back onto that primary die to additional digital multiplexers with which each transmit block on the primary die may choose the selected clock (or may choose a clock routed directly from any of the receive blocks on that die without being routed out of the die and back in).

Conversely, within the second group of dies in such simpler implementations, each secondary die includes an input buffer through with the selected clock may be routed onto that secondary die to additional digital multiplexers with which each transmit block on the secondary die may choose the selected clock (or may choose a clock routed directly from any of the receive blocks on that die rather than from the primary die). However, the secondary die in such simpler implementations has no provision to allow a receive clock generated by a receive block on the secondary die to be shared off-die.

Although "simpler" in one sense, such implementations require having two different types of dies in a device, and designating in advance which dies are primary dies that can share clocks with other dies (as well as within each die), and which dies are secondary dies that can receive clocks from primary dies (and can share clocks within each die) but cannot share their own clocks with other dies.

Therefore, in some more complex implementations, pairs of dies are coupled so that any one die in the pair may be primary relative to the other die in the pair. More particularly, any receive block on a particular die in the pair of dies can share its clock with transmit blocks on the particular die and on the other die in the pair, and any transmit block on a particular die can accept a receive clock from receive blocks on the particular die or receive blocks on the other die in the pair.

In some such "complex" implementations, each die includes two groups of transmit blocks and receive blocks, with each group including N receive blocks and N transmit blocks. In these implementations, within the die, the two groups of N receive blocks and N transmit blocks cannot communicate with each other. Within each group of N receive blocks and N transmit blocks, digital multiplexers allow each transmit block to select, as a reference clock, a receive clock originating in any of the N receive blocks in that group of N receive blocks and N transmit blocks. When used alone, each die can be configured as two independent N-channel transceivers, and thus the two dies can be configured as four independent N-channel transceivers.

Each group of N receive blocks and N transmit blocks on one die in the pair of dies also includes circuitry that allows each transmit block to select, as its baseline clock, a clock generated by any of the N receive blocks in one group of N receive blocks and N transmit blocks on the other die in the pair of dies (but not from the second group of N receive blocks and N transmit blocks on the other die). Thus, the two dies taken together include two separate groups of 2N receive blocks and 2N transmit blocks, with each group of 2N receive blocks and 2N transmit blocks being operable as either two N-channel transceivers or one 2N-channel transceiver. And because each group of N receive blocks and N transmit blocks on each particular die is independent of the other group of N receive blocks and N transmit blocks on that particular die, the fact that one of those two independent groups of N receive blocks and N transmit blocks is linked with one the two independent groups of N receive blocks and N transmit blocks on the other die as a 2N-channel transceiver does not mean that the other one of those two independent groups of N receive blocks and N transmit blocks on the particular die is linked to a group of N receive blocks and N transmit blocks on the other die. Therefore, the two dies can be configured as four independent N-channel transceivers, as two independent 2N-channel transceivers, or as one 2N-channel transceiver and two independent N-channel transceivers.

Specifically, as one illustration of such a "complex" implementation, each of the two dies may include eight receive blocks and eight transmit blocks, arranged as two groups of four receive blocks and four transmit blocks. A respective "local" digital multiplexer allows each transmit block in one group of four receive blocks and four transmit blocks to select, as its baseline clock, a receive clock from any one of the four receive blocks in that group of four receive blocks and four transmit blocks, but not from any of receive blocks in the other group of four receive blocks and four transmit blocks on that die. Each of the respective local digital multiplexers includes, in addition to four inputs corresponding to respective receive clocks output by the four receive blocks in the group of four receive blocks and four transmit blocks, a fifth input whose function will be described below.

In this illustration, a four-input "transmitting" multiplexer receives as inputs the respective receive clocks of the four receive blocks in the group of four receive blocks and four transmit blocks on the first die of the two dies, and outputs a selected one of those four receive clocks via an output buffer to a first inter-die link to the second die of the two dies. A two-input receiving multiplexer receives one input from a first input buffer coupled to the first inter-die link (fed back from the output buffer), and receives a second input from a second input buffer coupled to a second inter-die link from a corresponding group of four receive blocks and four transmit blocks on the second die.

In a corresponding group of four receive blocks and four transmit blocks on the second die, a respective "local" digital multiplexer allows each transmit block in one group of four receive blocks and four transmit blocks to select, as its baseline clock, a receive clock from any one of the four receive blocks in that group of four receive blocks and four transmit blocks, but not from any of the receive blocks in the other group of four receive blocks and four transmit blocks on that die. Each of the respective local digital multiplexers includes, in addition to four inputs corresponding to respective receive clocks output by the four receive blocks in the group of four receive blocks and four transmit blocks, a fifth input whose function will be described below.

A four-input "transmitting" multiplexer receives as inputs the respective receive clocks of the four receive blocks in the group of four receive blocks and four transmit blocks on the second die of the two dies, and outputs a selected one of those four receive clocks via an output buffer to the second inter-die link to the first die of the two dies. A two-input receiving multiplexer receives one input from a first input buffer coupled to the second inter-die link (fed back from the output buffer), and receives a second input from a second input buffer coupled to the first inter-die link from the corresponding group of four receive blocks and four transmit blocks on the first die.

As thus described, the first and second dies are identical to each other, meaning that any device incorporating this arrangement can be implemented with just one type of die. When used individually, each die can implement two separate four-channel transceivers. The transmitting and receiving buffers and the inter-die links are not used. When a larger transceiver is desired, the two groups on any one die cannot be used together, but corresponding groups of four receive blocks and four transmit blocks on the two dies can be combined via the inter-die links into an eight-channel transceiver.

One of the eight receive blocks will be deemed the primary receive block, supplying the baseline clock to all eight transmit blocks; the die on which the primary receive block is located may be considered the primary die as far as this eight-channel transceiver is concerned. The transmitting multiplexer will select the receive clock from the primary receive block and output the selected receive clock via the output buffer onto the first inter-die link, which will conduct the selected receive clock to the first input buffer of the primary die and to the second input buffer of the secondary die. The receiving buffer on the primary die will choose the first input buffer while the receiving buffer on the secondary die will choose the second input buffer and, in both cases, will output the selected receive clock to the aforementioned fifth input of each of the local multiplexers coupled to the four transmit blocks on the primary die and to the aforementioned fifth input of each of the local multiplexers coupled to the four transmit blocks on the secondary die.

A second eight-channel transceiver may be configured from the other two respective groups of four receive blocks and four transmit blocks on each of the two dies. In the second eight-channel transceiver, which of the two dies is primary and which is secondary will be determined by the location of the respective receive block selected as the source of the shared receive clock. Alternatively, the other two respective groups of four receive blocks and four transmit blocks on each of the two dies may be operated separately as four-channel transceivers, even though the first two respective groups of four receive blocks and four transmit blocks on each of the two dies are operating together as an eight-channel transceiver.

As noted above, each of the transmit blocks and each of the receive blocks has digital clock generation circuitry for clock generation. The digital clock generation circuitry in each transmit block uses the selected receive clock as its baseline clock to generate a respective transmit clock as its output, locked to the baseline clock. In some implementations, the digital clock generation circuitry includes a digitally-controlled oscillator, with digital control circuitry that may be similar to the digital front-end of a digital frequency-locked loop. The digitally-controlled oscillator may be an analog phase-locked loop circuit including a feedback divider whose divisor may be digitally controlled. For example, the feedback divider may have an integral portion and a fractional portion, along with a fractional modulator to allow dynamic adjustment of the feedback divisor based on real-time channel conditions. In some implementations the fractional modulator may be a delta-sigma modulator, controlled by a digital frequency control word output by the digital control circuitry. Such digital implementations consume substantially less power, and occupy less device area, than functionally comparable analog implementations.

The subject matter of this disclosure may be better understood by reference to FIGS. 1-9.

FIG. 1 is a schematic representation of a transceiver device 100 including two separate dies 101, 102 in a single package 103. This representation includes only the host-to-line side of a transceiver. Transceiver device 100 would also include a line-to-host side, which could be implemented as additional dies (not shown) in the same package 103, or could include additional circuitry on dies 101, 102 (as in the implementation shown in FIG. 2, below).

Each of dies 101, 102 includes a respective group 111, 112 of transmit block/receive block pairs 104. As discussed above, each of transmit blocks 114 in the transmit block/receive block pairs 104, and each of the receive blocks 124 in the transmit block/receive block pairs 104, is implemented in accordance with the present disclosure as digital circuitry. The number of transmit block/receive block pairs 104 in each group 111, 112 is N=4, and therefore the two integrated circuit dies 101, 102 may be used in two separate four-channel transceivers, or may be used together in a transceiver having eight channels (2N=8).

Clock distribution circuitry 105 allows each transmit block 114 to select, as its individual baseline clock, any clock output by any receive block 124 on the same one of integrated circuit dies 101, 102, using a respective one of clock multiplexers 115. In addition, clock distribution circuitry 105 allows any of the clocks output by one of receive blocks 124 on integrated circuit die 101 to be selected, using clock selection multiplexer 125, for transmission off integrated circuit die 101 via transmitting buffer 135, and back onto integrated circuit die 101 via receiving buffer 145, as well as onto integrated circuit die 102 via another receiving buffer 145.

The receive clock selected by clock selection multiplexer 125, after division by R (although R may be '1') in divider 126, and transmission off integrated circuit die 101 and back onto integrated circuit dies 101, 102, is available as an additional clock selection 127 at each of clock multiplexers 115, for selection by any or all of transmit blocks 114 on both of integrated circuit dies 101, 102. Although each transmit block 114 on integrated circuit die 101 could directly select the same clock as additional clock selection 127, if the transmit blocks 114 are to be used together in a multi-lane transceiver, then as discussed above, skew would be minimized if all transmit blocks 114—even those on integrated circuit die 101, select additional clock selection 127 which, for all transmit blocks 114 on both integrated circuit dies 101, 102, passes through clock selection multiplexer 125, clock transmitting buffer 135, and one of clock receiving buffers 145, as well as a clock path of substantially similar length.

Integrated circuit die 101 is labelled "primary" in FIG. 1, while integrated circuit die 102 is labelled "secondary." The reason for that distinction is apparent, in that only integrated circuit die 101 includes clock selection multiplexer 125, and therefore additional clock selection 127 can originate only in one of the receive blocks 124 on integrated circuit die 101, but not in any of the receive blocks 124 on integrated circuit die 102. However, while clock distribution circuitry 105 is relatively straightforward, the arrangement shown in FIG. 1 requires two separate types of integrated circuit dies 101, 102 in a single device 100.

Therefore, in other implementations of the subject matter of this disclosure, the clock distribution may be relatively more complex than clock distribution circuitry 105, but the "primary" and "secondary" integrated circuit dies may be identical, allowing the fabrication of a device with only one integrated circuit device type.

Figure 2:
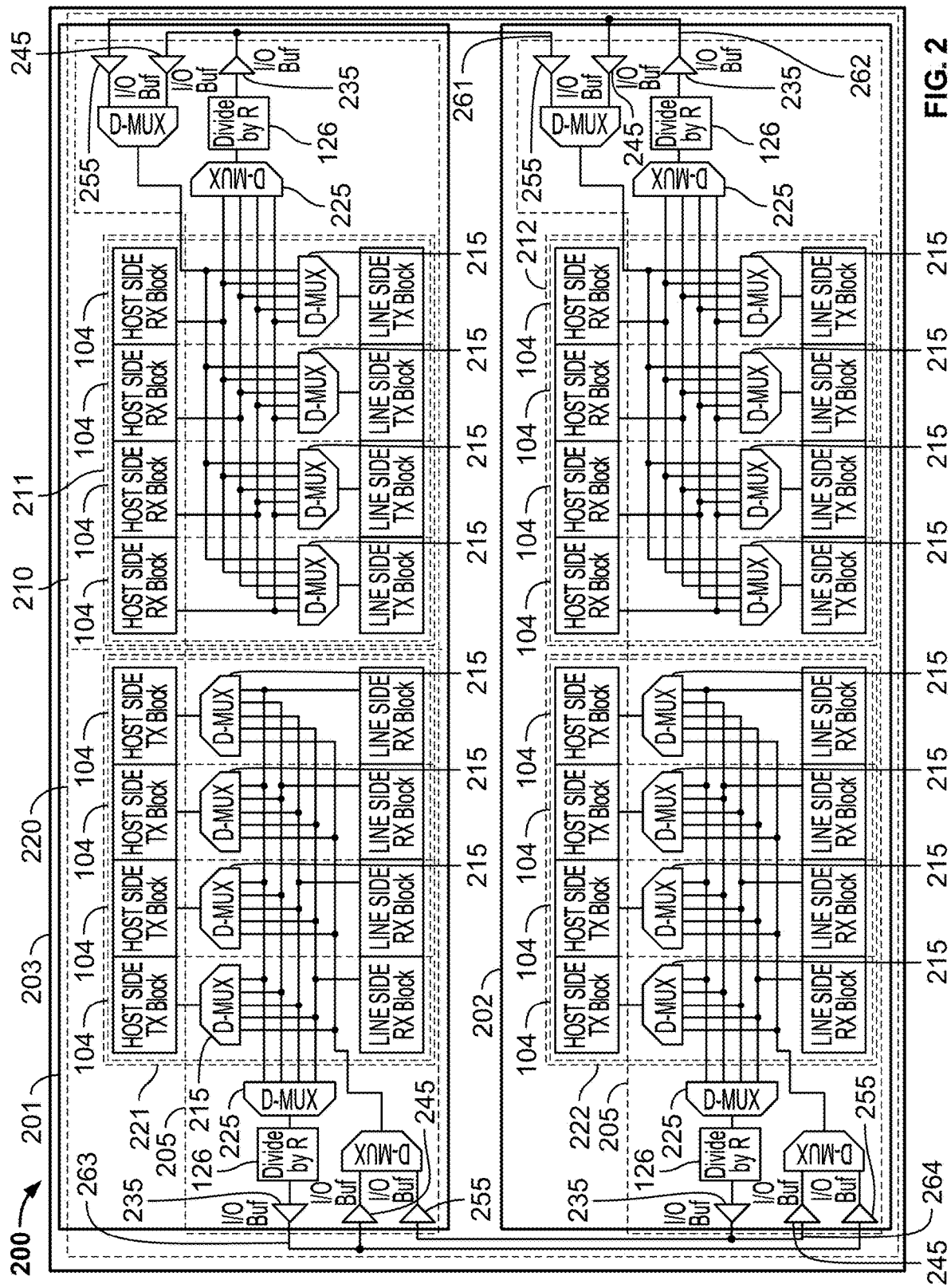
FIG. 2 is a schematic representation of a transceiver device, including two separate dies in a single package, incorporating a second implementation of the subject matter of this disclosure.

An illustration, according to such an implementation of the subject matter of this disclosure, of a transceiver device 200 including two separate dies 201, 202 in a single package 203 is shown in FIG. 2. In this representation, transceiver device 200 is labelled as including both host-to-line portion 210 and line-to-host portion 220, although the same die arrangement could be configured as two host-to-line portions or two line-to-host portions.

As in the case of transceiver device 100 of FIG. 1, in transceiver device 200 of FIG. 2, N=4. Eight-channel host-to-line portion 210 includes 2N=8 transmit block/receive block pairs 104, divided into two groups of N=4 transmit block/receive block pairs 104—group 211 on integrated circuit die 201, and group 212 on integrated circuit die 202. Similarly, eight-channel host-to-line portion 220 includes 2N=8 transmit block/receive block pairs 104, divided into two groups of N=4 transmit block/receive block pairs 104—group 221 on integrated circuit die 201, and group 222 on integrated circuit die 202.

Each of the four groups 211, 212, 221, 222 of four transmit block/receive block pairs 104 in FIG. 2 is essentially identical, including not only the four transmit block/receive block pairs 104, but also clock distribution circuitry 205. Similarly to clock distribution circuitry 105, clock distribution circuitry 205 allows each transmit block 114 to select, as its individual baseline clock, any clock output by any receive block 124 in the same one of groups 211, 212, 221, 222 using a respective one of clock multiplexers 215. In addition, clock distribution circuitry 205 allows any of the clocks output by one of receive blocks 124 to be selected, using clock selection multiplexer 225, for transmission off its respective one of integrated circuit dies 201, 202 via transmitting buffer 235, and back onto that respective one of integrated circuit dies 201, 202 to its respective one of groups 211, 212, 221, 222 via receiving buffer 245, as well as onto the other one of integrated circuit dies 201, 202 via receiving buffer 255, but only to one of the corresponding groups (211 or 221) on that other one of integrated circuit dies 201, 202. Separate respective inter-die links 261, 262, 263, 264 are provided for those connections.

Specifically, considering group 211 on integrated circuit die 201, any one of transmit blocks 114 in group 211 can use its respective one of multiplexers 215 to select, as a baseline clock, a clock output by any one of receive blocks 124 in that group 211. Multiplexer 225 in group 211 also can be used to select a clock output by any one of receive blocks 124 in that group 211, for sharing among all transmit blocks 114 in group 211 as well as in group 212, using transmitting buffer 235 to transmit the selected clock onto inter-die link 261, which conducts the selected clock back to group 211 via receiving buffer 245, as well as to group 212 via receiving buffer 255.

Similarly, considering group 212 on integrated circuit die 202, any one of transmit blocks 114 in group 212 can use its respective one of multiplexers 215 to select, as a baseline clock, a clock output by any one of receive blocks 124 in that group 212. Multiplexer 225 in group 212 also can be used to select a clock output by any one of receive blocks 124 in that group 212, for sharing among all transmit blocks 114 in group 212 as well as in group 211, using transmitting buffer 235 to transmit the selected clock onto inter-die link 262, which conducts the selected clock back to group 212 via receiving buffer 245, as well as to group 211 via receiving buffer 255.

Similarly, considering group 221 on integrated circuit die 201, any one of transmit blocks 114 in group 221 can use its respective one of multiplexers 215 to select, as a baseline clock, a clock output by any one of receive blocks 124 in that group 221. Multiplexer 225 in group 221 also can be used to select a clock output by any one of receive blocks 124 in that group 221, for sharing among all transmit blocks 114 in group 221 as well as in group 222, using transmitting buffer 235 to transmit the selected clock onto inter-die link 263, which conducts the selected clock back to group 221 via receiving buffer 245, as well as to group 222 via receiving buffer 255.

Similarly, considering group 222 on integrated circuit die 202, any one of transmit blocks 114 in group 222 can use its respective one of multiplexers 215 to select, as a baseline clock, a clock output by any one of receive blocks 124 in that group 222. Multiplexer 225 in group 222 also can be used to select a clock output by any one of receive blocks 124 in that group 222, for sharing among all transmit blocks 114 in group 222 as well as in group 221, using transmitting buffer 235 to transmit the selected clock onto inter-die link 264, which conducts the selected clock back to group 222 via receiving buffer 245, as well as to group 221 via receiving buffer 255.

Unlike integrated circuit dies 101, 102 in FIG. 1, integrated circuit dies 201, 202 of FIG. 2 are not labelled "primary" and "secondary," because depending on which configuration is in use, either one of integrated circuit dies 201, 202 could be primary relative to the other. Indeed, in one configuration that may be common, groups 211 and 212 could be used as a host-to-line interface, while groups 221 and 222 are used as a line-to-host interface, in which case each of dies 201, 202 will be both primary to the other of dies 201, 202 and secondary to the other of dies 201, 202. However, as noted above, in other configurations, the combinations of groups 211 and 212, and groups 221 and 222, could both be used in the same direction, in which case one of dies 201, 202 would be primary to the other of dies 201, 202, or the combination of groups 211 and 212 could be used as a 2N-lane interface while each groups 221, 222 is used as a separate N-lane interface. In such a case, one of dies 201, 202 will be primary to the other of dies 201, 202 as far as the combination of groups 211 and 212 is concerned, but neither of dies 201, 202 will be primary to the other of dies 201, 202 as far as the separate interfaces of groups 221, 222 are concerned.

Figure 3:
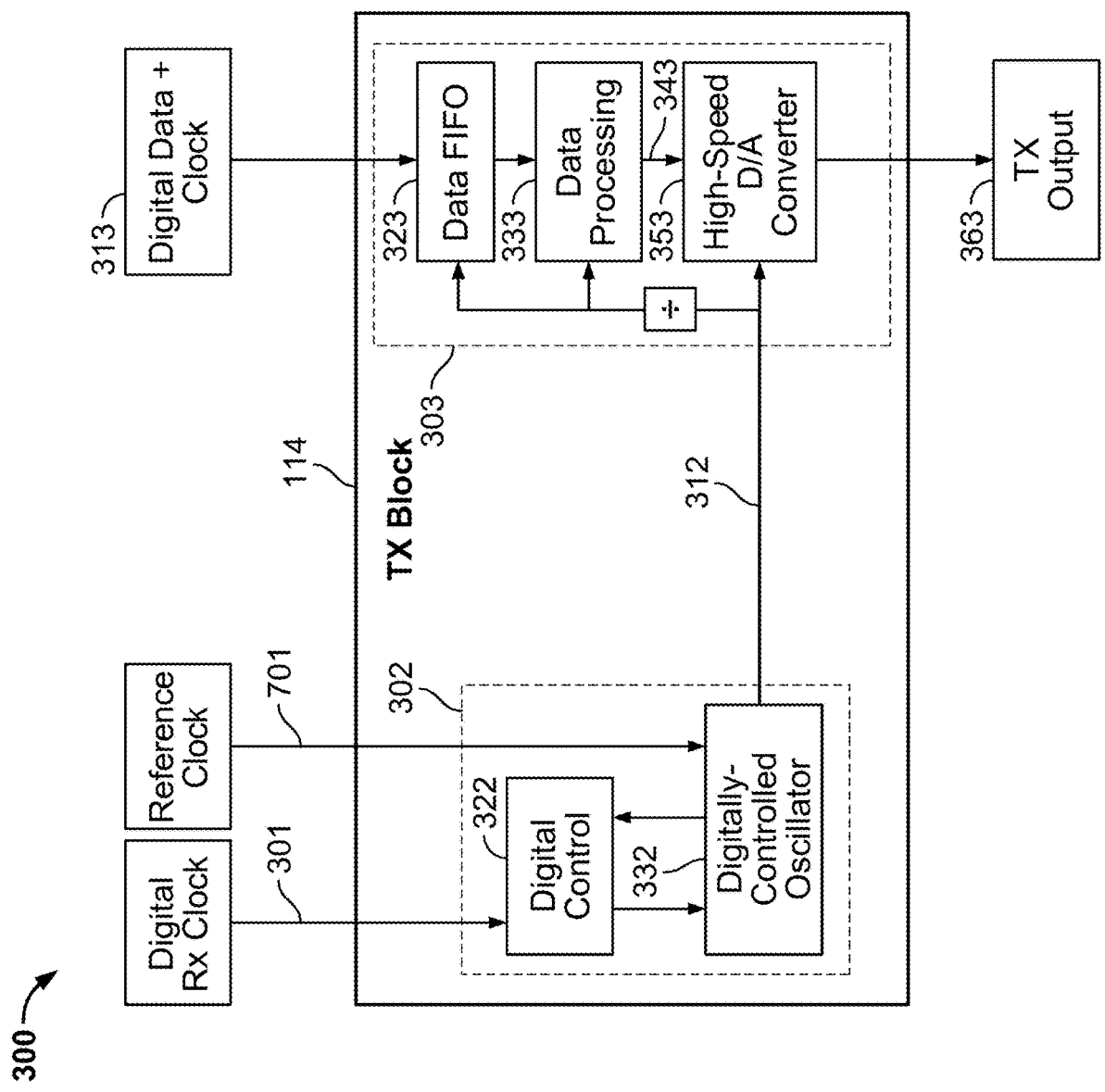
FIG. 3 is a schematic representation of a digital transmit block used in implementations of the subject matter of this disclosure.

Although the implementations described thus far include N transmit block/receive block pairs on each of two dies, implementations using any number D>2 dies are possible. For example, implementations similar to implementation 100, but with multiple secondary dies, are possible As noted above, the circuitry of implementations of the subject matter of this disclosure is substantially all digital. A schematic representation 300 of one of digital transmit blocks 114, which receives the selected baseline clock 301 from one of digital receive blocks 124, is shown in FIG. 3. Baseline clock 301 is used by digital clock generating circuitry 302, as described in more detail below, to derive a digital clock 312 for use by data handling circuitry 303. Data handling circuitry 303 receives digital data 313 (which may be accompanied by a digital clock) and processes digital data 313 in data processing circuitry 333. In order to align data 313 with the clock rate of clock 312, data 313 is input to digital FIFO 323 and clocked out to data processing circuitry 333 based on a divided-down version of clock 312. After processing in data processing circuitry 333, the processed data 343 is converted by high-speed digital-to-analog converter 353 (which is clocked by clock 312), and is then output at 363.

Digital clock generation circuitry 302 may include a digital control circuit 322 controlling a digitally-controlled oscillator 332. In the implementations shown in the drawings, digitally-controlled oscillator 332 is a PLL with a digitally-controlled feedback divider, and the digital control circuit is a digital phase/frequency control core, as described below in connection with FIGS. 4-7.

Figure 4:
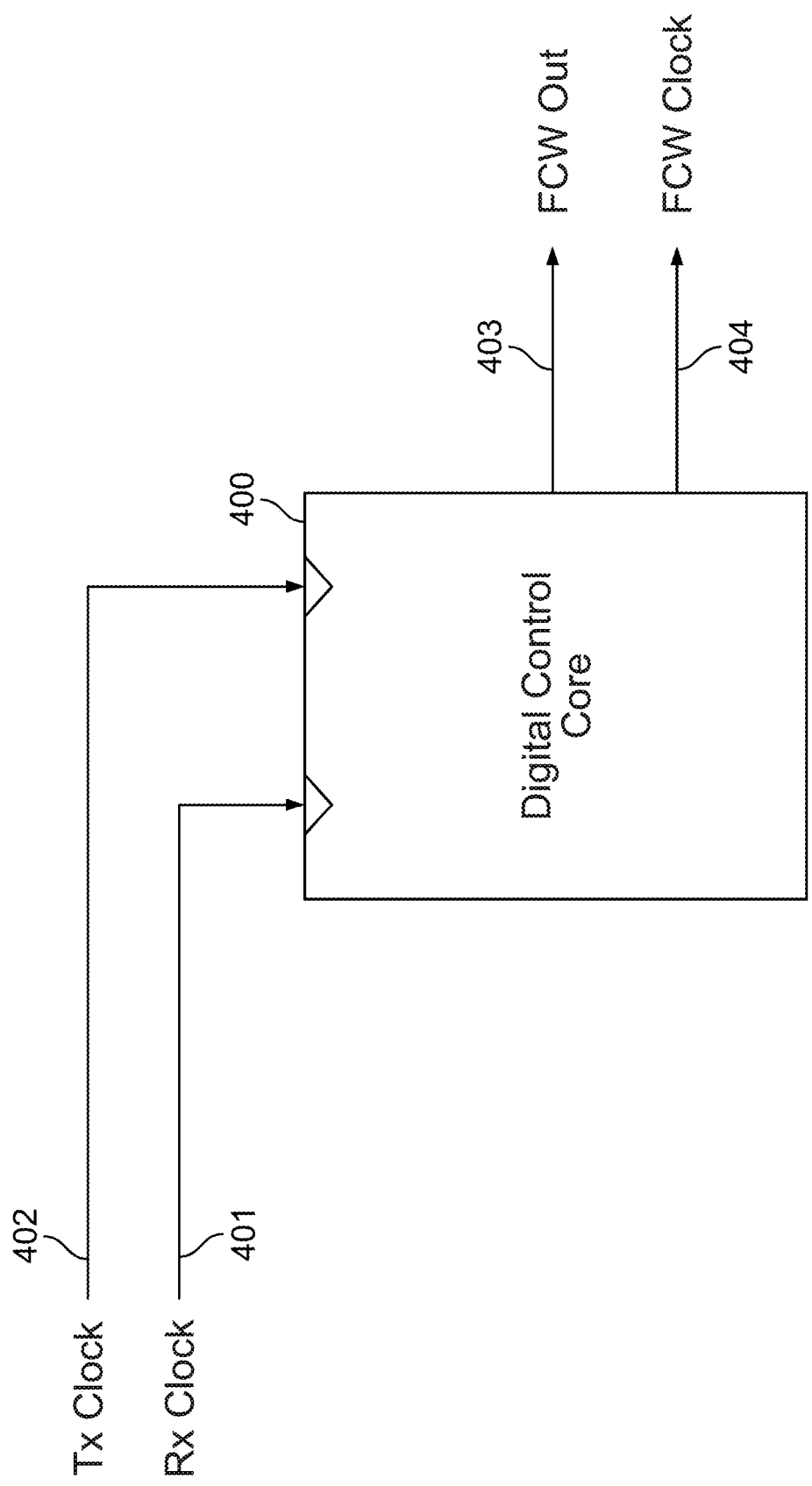
FIG. 4 is a high-level diagram of a digital control core according to implementations of the subject matter of this disclosure.

FIG. 4 is a high-level diagram of a digital loop control or control core 400 according to implementations of the subject matter of this disclosure. One input of digital control core 400 is a receive clock (Rx clock) 401, which is the selected clock 127, referred to above, that is output by one of receive blocks 124, which is used as a baseline. The other input of digital control core 400 is a transmit clock (Tx clock) 402, which is the fed-back output of the digital clock generation circuitry 302 of which digital control core 400 is a part, and which digital clock generation circuitry 302 attempts to lock to receive clock 401. The outputs of digital control core 400 are a digital frequency control word (FCW) 403, and a corresponding FCW clock 404.

Figure 5:
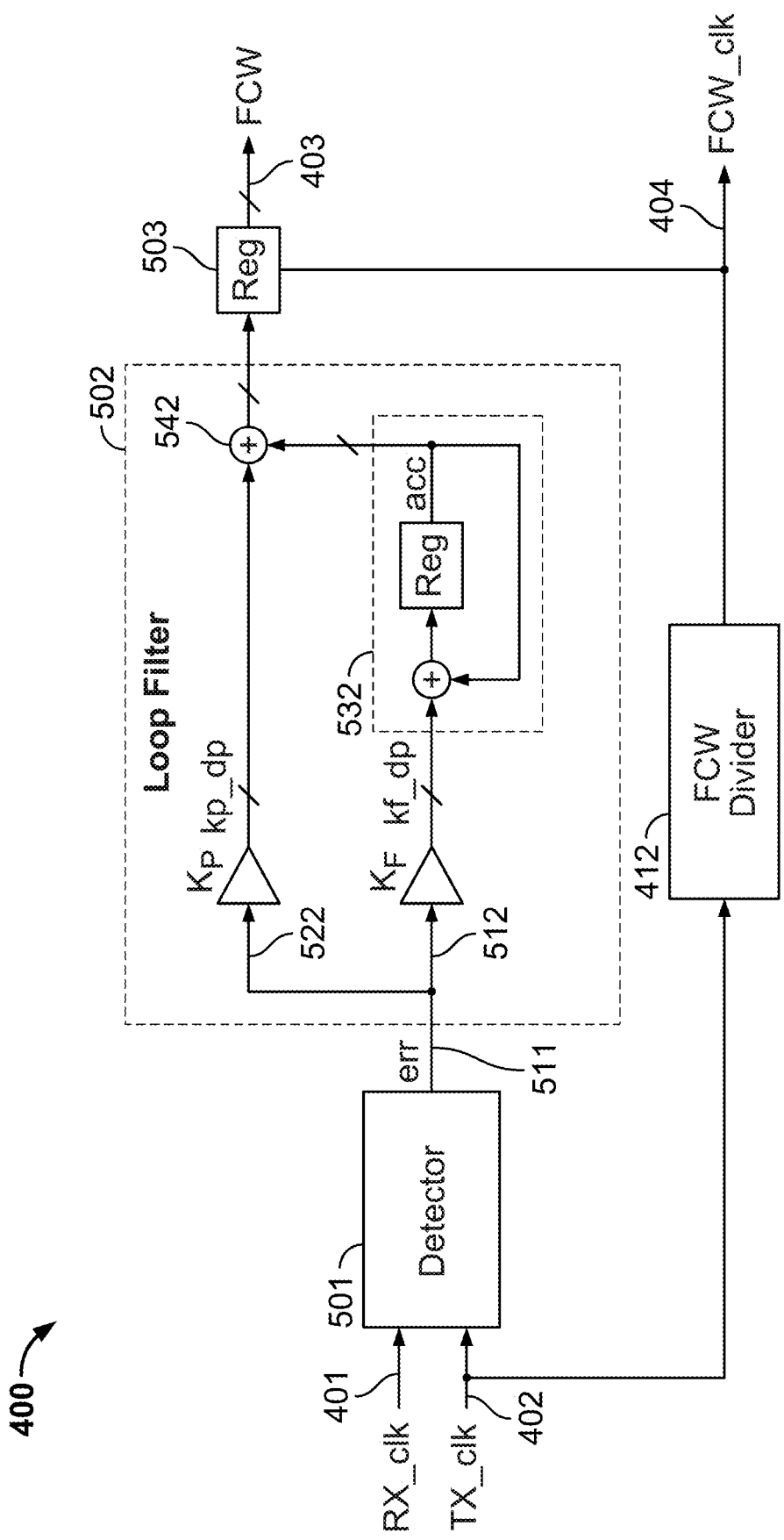
FIG. 5 is a diagram showing additional details of the digital control core of FIG. 4.

Further detail of digital control core 400 is shown in FIG. 5. Receive clock 401 and transmit clock 402 are input to a digital phase or phase/frequency detector 501, which outputs an error signal (err) 511. Phase detector 501 may be counter-based, or may be a Bang-Bang phase detector. Loop filter 502 accumulates at 532 a running sum of error signals 511 in fixed path 512 as a slowly-varying portion of FCW 403, while passing the current error signal 511 via proportional path 522 as a fast-varying portion of FCW 403. The slow-varying and fast-varying portions are added at 542 and the dynamically varying result is stored in register 503, from which a dynamically varying FCW 403 is output according to FCW clock 404, which is derived from transmit clock 402 by FCW divider 412 (which may be set to divide by '1', or by another value depending on the operating frequency of fractional modulator 707). FCW clock 404 also is output from digital control core 400 along with FCW 403.

Figure 6:
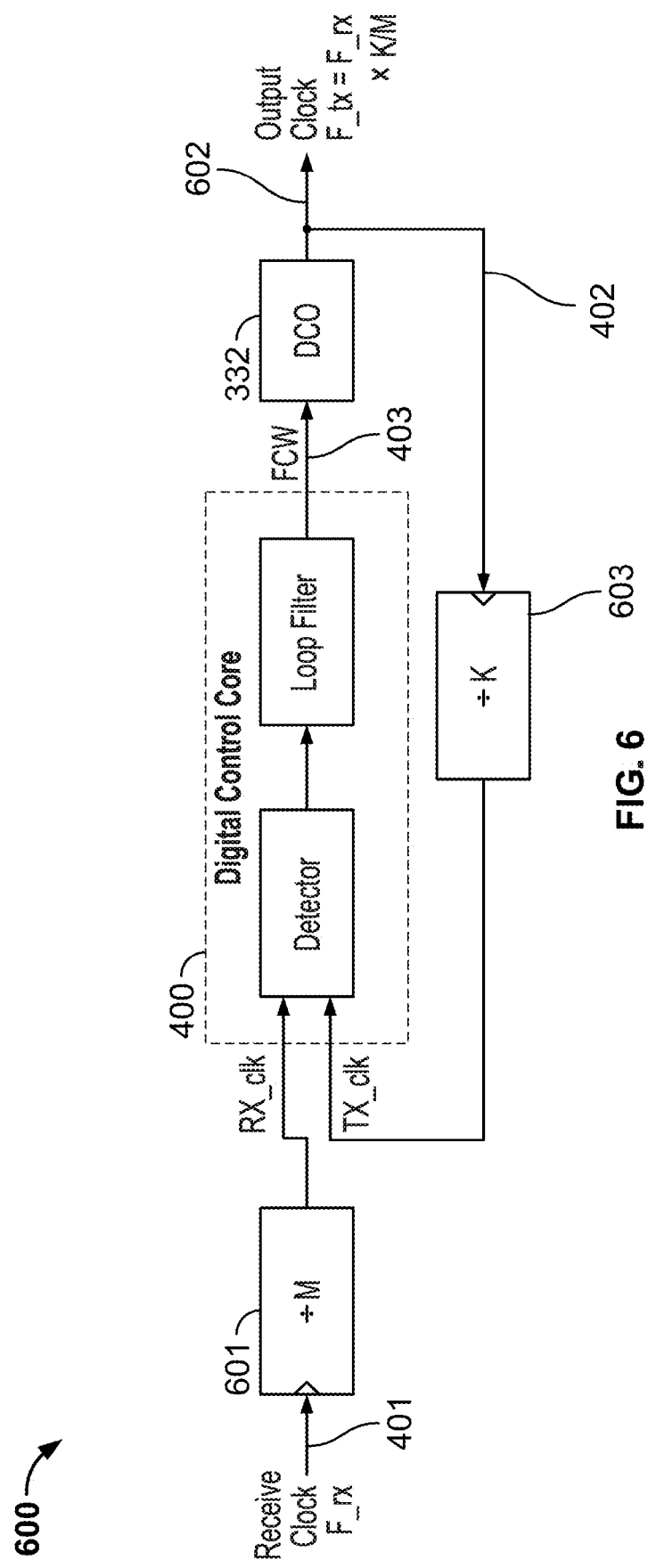
FIG. 6 is a schematic representation of digital clock generation circuitry according to implementations of the subject matter of this disclosure.

As discussed above in connection with FIG. 3, and as seen in the implementation 600 shown in FIG. 6, digital clock generation circuitry 302 may be a loop circuit including digital control core 400 providing FCW 403 (and FCW 404; not shown in FIG. 6) to digitally-controlled oscillator circuitry 332. The output of digitally-controlled oscillator circuitry 332 is transmit clock 402, which is intended to be locked to receive clock 401, is fed back to the input digital control core 400. Depending on its frequency, receive clock 401 may be divided down (e.g., by a factor M) at input divider 601 to a more useful frequency range. The fed-back output clock 402 may be divided (e.g., by the factor K) using feedback divider 603 (which has the effect of multiplying the output by K). Normally, in order to restore the original frequency at the output 602, K would be set equal to M, but if desired, K could be set to a different value, resulting in transmit clock 402 being phase-locked to receive clock 401 but having a frequency multiplied by K/M. However, normally any such frequency manipulation is performed in DCO 332 as described below, and dividers 601 and 603 may be omitted.

Figure 7:
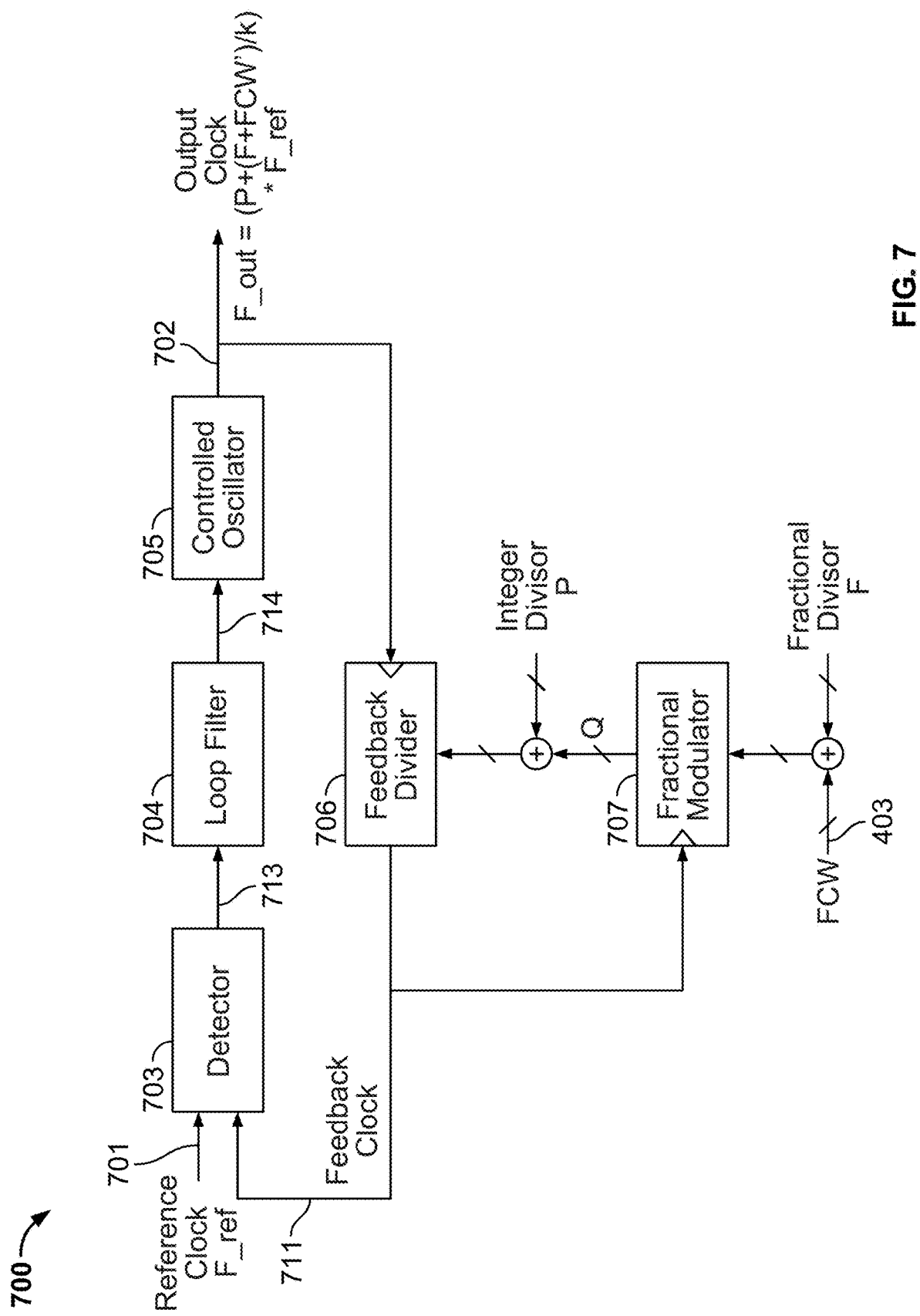
FIG. 7 is a schematic representation of a digitally-controlled oscillator according to implementations of the subject matter of this disclosure.

FIG. 7 shows an implementation 700 of DCO 332, based on a phase-locked loop. A reference clock (having frequency F_ref) 701 and a divided fed-back version 711 of output clock 702 are input to detector 703, which in the case of an analog PLL may be an analog phase/frequency detector. The specific value of reference clock 701 may be chosen to be close to the expected range of receive clock 401.

Detector 703 outputs an error signal 713 to loop filter 704, which in the case of an analog PLL may include an analog charge pump as well as an R-C filter. Loop filter 704 outputs a signal 714 to controlled oscillator 705 in the direction indicated by error signal 713. In the case of an analog PLL, oscillator 705 may be a voltage-controlled oscillator, and signal 714 may be a voltage whose magnitude determines the output 702 of oscillator 705.

Output clock 702 is fed back to the input of detector 703 via feedback divider 706, which has the effect of multiplying reference clock 701 by the divisor of feedback divider 706. The divisor of feedback divider 706 is the sum of an input divisor P (which may be user-selected) and the output Q of fractional modulator 707 (which may be, e.g., a delta-sigma modulator). Output Q of fractional modulator 707 may be the modulator output resulting from the sum of an input fractional divisor F (which may be user-selected) and the dynamically-varying value of FCW 403. As a result, the divisor of feedback divider 706 is a dynamically varying mixed number equal to P+(F+FCW')/k, where k depends on the particular fractional modulator implementation (e.g., k=$2^B$ when fractional modulator 707 is a multi-stage noise shaping (MASH) delta-sigma modulator), and FCW' is an average value, rather than the instantaneous value, of FCW 403. Output 702 is a signal having a frequency F out=(P+(F+FCW')/k)×F_ref.

Figure 8:
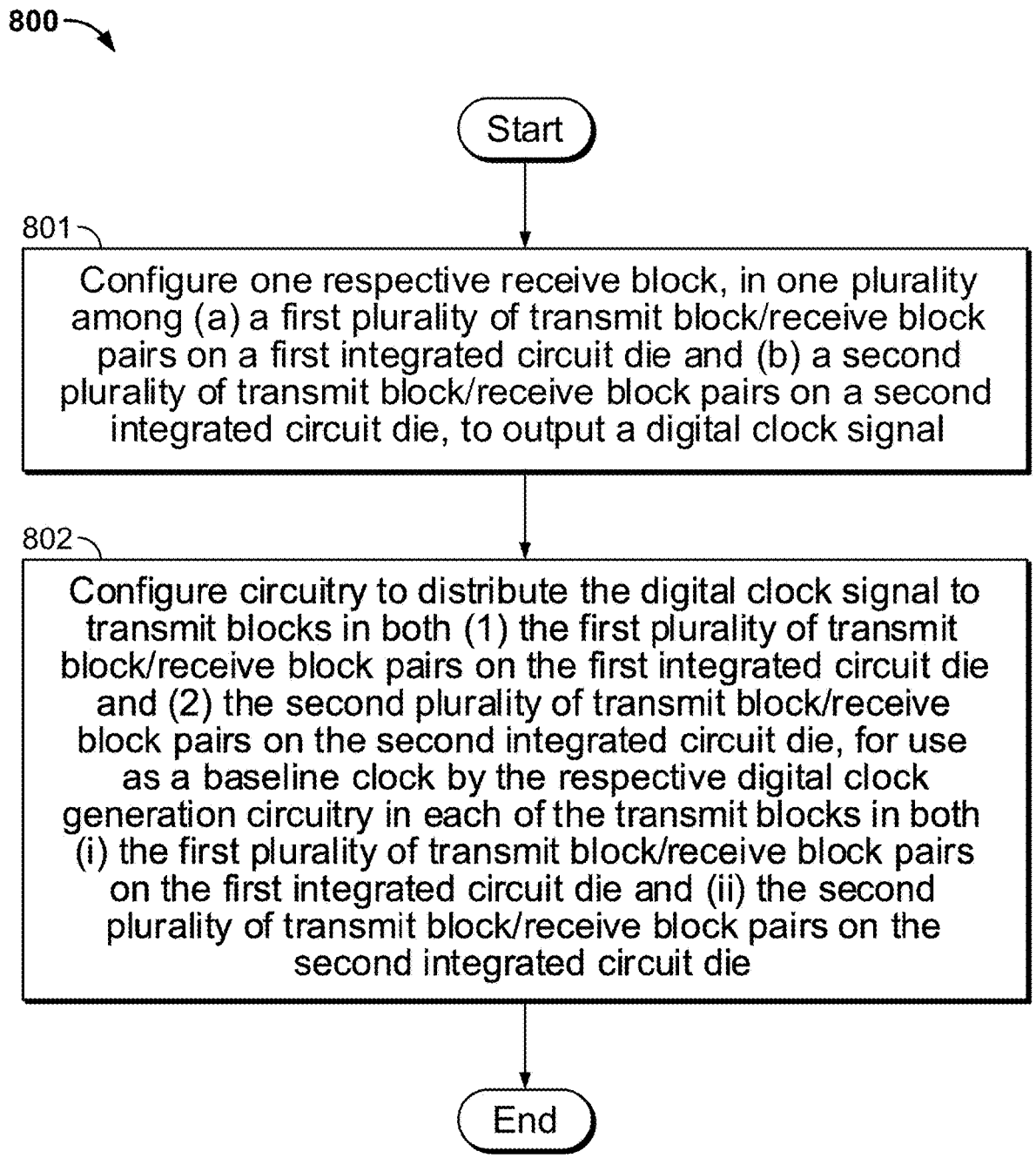
FIG. 8 is a flow diagram showing a first method in accordance with implementations of the subject matter of this disclosure.

A method 800 according to implementations of the subject matter of this disclosure for forming a multi-lane integrated circuit transceiver device is diagrammed in FIG. 8. Method 800 begins at 801 where one respective receive block, in one plurality among (a) a first plurality of transmit block/receive block pairs on a first integrated circuit die and (b) a second plurality of transmit block/receive block pairs on a second integrated circuit die, is configured to output a digital clock signal. At 802, circuitry to distribute the digital clock signal to transmit blocks in both (1) the first plurality of transmit block/receive block pairs on the first integrated circuit die and (2) the second plurality of transmit block/receive block pairs on the second integrated circuit die, for use as a baseline clock by the respective digital clock generation circuitry in each of the transmit blocks in both (i) the first plurality of transmit block/receive block pairs on the first integrated circuit die and (ii) the second plurality of transmit block/receive block pairs on the second integrated circuit die is configured. Method 800 then ends.

Figure 9:
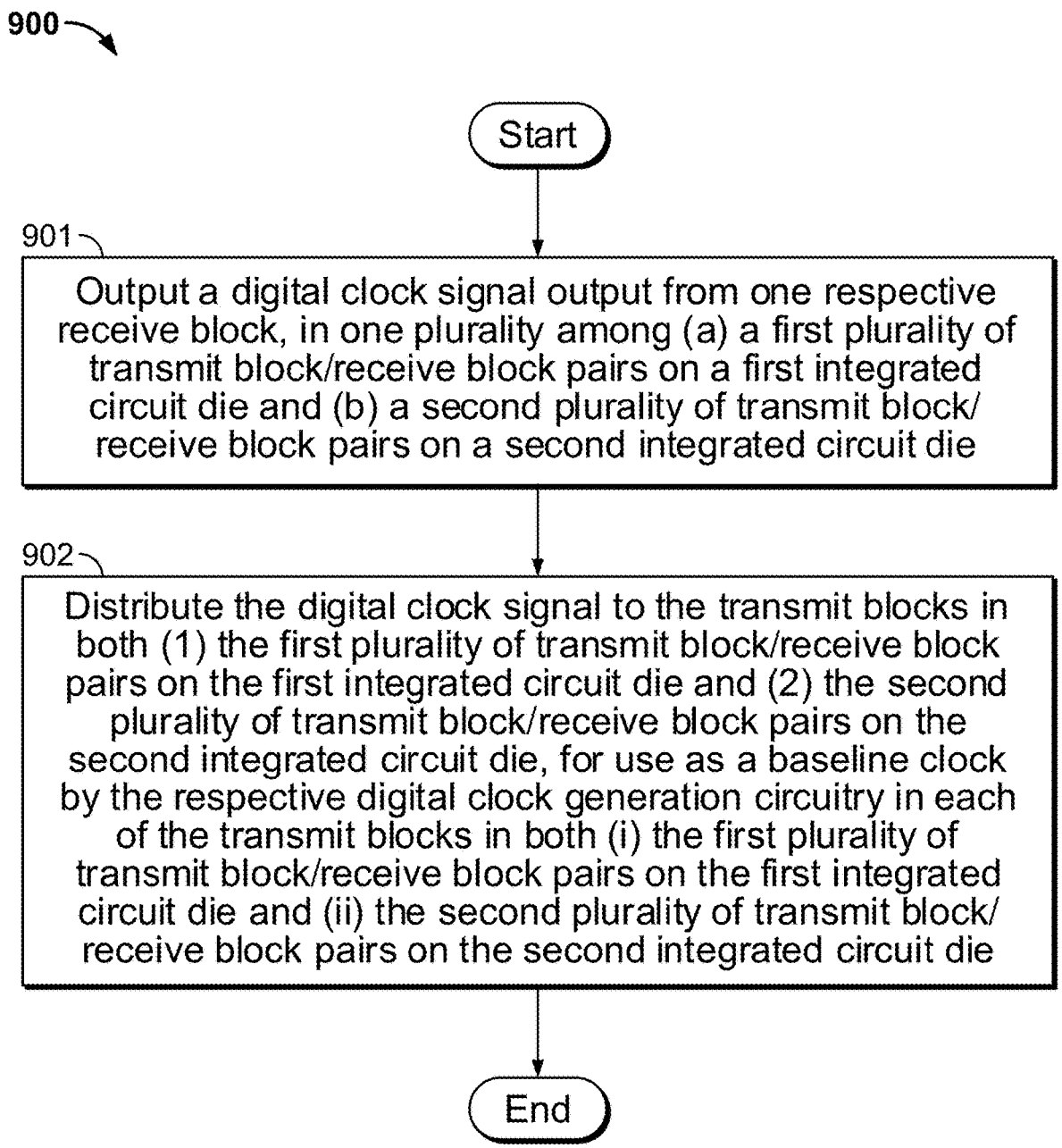
FIG. 9 is a flow diagram showing a second method in accordance with implementations of the subject matter of this disclosure.

A method 900 according to implementations of the subject matter of this disclosure for clocking a multi-lane integrated circuit transceiver device is diagrammed in FIG. 9. Method 900 begins at 901 where a digital clock signal is outputted from one respective receive block, in one plurality among (a) a first plurality of transmit block/receive block pairs on a first integrated circuit die and (b) a second plurality of transmit block/receive block pairs on a second integrated circuit die. At 902, the digital clock signal is distributed to the transmit blocks in both (1) the first plurality of transmit block/receive block pairs on the first integrated circuit die and (2) the second plurality of transmit block/receive block pairs on the second integrated circuit die, for use as a baseline clock by the respective digital clock generation circuitry in each of the transmit blocks in both (i) the first plurality of transmit block/receive block pairs on the first integrated circuit die and (ii) the second plurality of transmit block/receive block pairs on the second integrated circuit die. Method 900 then ends.

Thus it is seen that a method and apparatus for digital clock sharing between multiple integrated circuit dies in an Ethernet physical layer transceiver or network switch have been provided.

As used herein and in the claims which follow, the construction "one of A and B" shall mean "A or B."

It is noted that the foregoing is only illustrative of the principles of the invention, and that the invention can be practiced by other than the described embodiments, which are presented for purposes of illustration and not of limitation, and the present invention is limited only by the claims which follow.

What is claimed is:

1. A multi-lane integrated circuit transceiver device comprising:
   a first integrated circuit die having a first plurality of transmit block/receive block pairs; and
   a second integrated circuit die having a second plurality of transmit block/receive block pairs; wherein:
   each respective transmit block and each respective receive block in (A) the first plurality of transmit block/receive block pairs on the first integrated circuit die and (B) the second plurality of transmit block/receive block pairs on the second integrated circuit die comprises respective digital clock generation circuitry; the multi-lane transceiver device further comprising:
   digital clock distribution circuitry configured to distribute a digital clock signal output by one respective receive block, in one plurality among (a) the first plurality of transmit block/receive block pairs on the first integrated circuit die and (b) the second plurality of transmit block/receive block pairs on the second integrated circuit die, to the transmit blocks in both (1) the first plurality of transmit block/receive block pairs on the first integrated circuit die and (2) the second plurality of transmit block/receive block pairs on the second integrated circuit die, for use as a baseline clock by the respective digital clock generation circuitry in each of the transmit blocks in both (i) the first plurality of transmit block/receive block pairs on the first integrated circuit die and (ii) the second plurality of transmit block/receive block pairs on the second integrated circuit die; the digital clock distribution circuitry comprising:
   buffer circuitry on the first integrated circuit die and the second integrated circuit die configured to transmit the digital clock signal output by the one respective receive block off of the first integrated circuit die and onto both the first integrated circuit die and the second integrated circuit die.

2. The multi-lane integrated circuit transceiver device of claim 1, wherein:
   the first plurality of transmit block/receive block pairs on the first integrated circuit die comprises N transmit block/receive block pairs;
   the second plurality of transmit block/receive block pairs on the second integrated circuit die comprises N transmit block/receive block pairs; and
   the multi-lane integrated circuit transceiver device comprises 2N lanes.

3. The multi-lane integrated circuit transceiver device of claim 2, wherein:
   the first integrated circuit die is a primary integrated circuit die comprising no more than N transmit block/receive block pairs configured to form a first group of transmit block/receive block pairs;

the second integrated circuit die is a secondary integrated circuit die comprising no more than N transmit block/receive block pairs configured to form a second group of transmit block/receive block pairs; and the first integrated circuit die and the second integrated circuit die together form a single 2N-lane transceiver.

4. The multi-lane integrated circuit transceiver device of claim 2, wherein:

the first integrated circuit die and the second integrated circuit die are identical, each comprising 2N transmit block/receive block pairs;

the digital clock distribution circuitry comprises buffer circuitry on the first integrated circuit die and the second integrated circuit die configured to transmit the digital clock signal, output by a first respective receive block, off of one of the first integrated circuit die and the second integrated circuit die, and onto both the first integrated circuit die and the second integrated circuit die, for sharing by a first group of transmit block/receive block pairs including N transmit block/receive block pairs on the first integrated circuit die and N transmit block/receive block pairs on the second integrated circuit die, and to transmit the digital clock signal, output by a second respective receive block, off one of the first integrated circuit die and the second integrated circuit die, and onto both the first integrated circuit die and the second integrated circuit die, for sharing by a second group of transmit block/receive block pairs including N transmit block/receive block pairs on the first integrated circuit die and N transmit block/receive block pairs on the second integrated circuit die; and the first group of transmit block/receive block pairs including N transmit block/receive block pairs on the first integrated circuit die and N transmit block/receive block pairs on the second integrated circuit die forms a first 2N-lane transceiver, and the second group of transmit block/receive block pairs including N transmit block/receive block pairs on the first integrated circuit die and N transmit block/receive block pairs on the second integrated circuit die form a second 2N-lane transceiver.

5. The multi-lane integrated circuit transceiver device of claim 1, wherein the respective digital clock generation circuitry comprises:

digitally-controlled oscillator circuitry; and digital control circuitry configured to compare output of the digital clock generation circuitry to the baseline clock, and to output digital control signals to control the digitally-controlled oscillator circuitry.

6. The multi-lane integrated circuit transceiver device of claim 5, wherein the digital control circuitry is a digital loop control circuit comprising a digital phase detector and a digital loop filter.

7. The multi-lane integrated circuit transceiver device of claim 6, wherein the digitally-controlled oscillator circuitry comprises:

analog phase-locked loop circuitry including, in series, a phase detector, a charge pump, a loop filter and an oscillator, and further including a feedback divider through which output of the oscillator is fed back to a first input of the phase detector, the phase detector having a second input configured to receive a reference clock signal; and a fractional modulator that controls a divisor of the feedback divider.

8. The multi-lane integrated circuit transceiver device of claim 7, wherein the fractional modulator is a delta-sigma modulator.

9. The multi-lane integrated circuit transceiver device of claim 7, wherein the digital control circuitry is configured to output digital control signals for the fractional modulator to dynamically control the divisor of the feedback divider.

10. The multi-lane integrated circuit transceiver device of claim 6, wherein the digital phase detector is a Bang-Bang phase detector.

11. A method of forming a multi-lane integrated circuit transceiver device including (A) a first integrated circuit die having a first plurality of transmit block/receive block pairs, and (B) a second integrated circuit die having a second plurality of transmit block/receive block pairs, each respective transmit block and each respective receive block in the (I) first plurality of transmit block/receive block pairs on the first integrated circuit die, and (II) the second plurality of transmit block/receive block pairs on the second integrated circuit die, including respective digital clock generation circuitry; the method comprising:

configuring one respective receive block, in one plurality among (a) the first plurality of transmit block/receive block pairs on the first integrated circuit die and (b) the second plurality of transmit block/receive block pairs on the second integrated circuit die, to output a digital clock signal; and configuring circuitry to distribute the digital clock signal to the transmit blocks in both (1) the first plurality of transmit block/receive block pairs on the first integrated circuit die and (2) the second plurality of transmit block/receive block pairs on the second integrated circuit die, by transmitting the digital clock signal output by the one respective receive block off the first integrated circuit die and onto both the first integrated circuit die and the second integrated circuit die, for use as a baseline clock by the respective digital clock generation circuitry in each of the transmit blocks in both (i) the first plurality of transmit block/receive block pairs on the first integrated circuit die and (ii) the second plurality of transmit block/receive block pairs on the second integrated circuit die.

12. The method according to claim 11 for forming a multi-lane integrated circuit transceiver device, further comprising combining the N transmit block/receive block pairs on the first integrated circuit die and the N transmit block/receive block pairs on the second integrated circuit die to form a multi-lane integrated circuit transceiver device comprising 2N lanes.

13. The method according to claim 12 for forming a multi-lane integrated circuit transceiver device, comprising:

configuring the first integrated circuit die as a primary integrated circuit die having no more than N transmit block/receive block pairs forming a first group of transmit block/receive block pairs;

configuring the second integrated circuit die as a secondary integrated circuit die having no more than N transmit block/receive block pairs forming a second group of transmit block/receive block pairs, so that the first integrated circuit die and the second integrated circuit die together form a single 2N-lane transceiver.

14. The method according to claim 12 for forming a multi-lane integrated circuit transceiver device, where the first integrated circuit die and the second integrated circuit die are identical, each comprising 2N transmit block/receive block pairs; the method comprising:

configuring the digital clock distribution circuitry on the first integrated circuit die and the second integrated circuit die to transmit the digital clock signal output by a first respective receive block off one of the first integrated circuit die and the second integrated circuit die, and onto both the first integrated circuit die and the second integrated circuit die, for sharing by a first group of transmit block/receive block pairs including N transmit block/receive block pairs on the first integrated circuit die and N transmit block/receive block pairs on the second integrated circuit die, and to transmit the digital clock signal output by a second respective receive block off one of the first integrated circuit die and the second integrated circuit die, and onto both the first integrated circuit die and the second integrated circuit die, for sharing by a second group of transmit block/receive block pairs including N transmit block/receive block pairs on the first integrated circuit die and N transmit block/receive block pairs on the second integrated circuit die; wherein:

the first group of transmit block/receive block pairs including N transmit block/receive block pairs on the first integrated circuit die and N transmit block/receive block pairs on the second integrated circuit die forms a first 2N-lane transceiver, and the second group of transmit block/receive block pairs including N transmit block/receive block pairs on the first integrated circuit die and N transmit block/receive block pairs on the second integrated circuit die forms a second 2N-lane transceiver.

15. The method according to claim 11 for forming a multi-lane integrated circuit transceiver device, further comprising configuring the respective digital clock generation circuitry to include:

digitally-controlled oscillator circuitry; and digital control circuitry configured to compare output of the digital clock generation circuitry to the baseline clock, and to output digital control signals to control the digitally-controlled oscillator circuitry.

16. The method according to claim 15 for forming a multi-lane integrated circuit transceiver device, wherein configuring the respective digital clock generation circuitry to include digital control circuitry comprises configuring a digital loop control circuit including a digital phase detector and a digital loop filter.

17. The method according to claim 16 for forming a multi-lane integrated circuit transceiver device, wherein configuring the respective digital clock generation circuitry to include digitally-controlled oscillator circuitry comprises:

configuring analog phase-locked loop circuitry including, in series, a phase detector, a charge pump, a loop filter and an oscillator, and further including a feedback divider through which output of the oscillator is fed back to a first input of the phase detector, the phase detector having a second input configured to receive a reference clock signal; and configuring a fractional modulator that controls a divisor of the feedback divider.

18. The method according to claim 17 for forming a multi-lane integrated circuit transceiver device, wherein configuring the fractional modulator comprises configuring a delta-sigma modulator.

19. The method according to claim 17 for forming a multi-lane integrated circuit transceiver device, wherein configuring the digital control circuitry comprises configuring the digital control circuitry to output digital control signals for the fractional modulator to dynamically control the divisor of the feedback divider.

20. A method of clocking a multi-lane integrated circuit transceiver device including (A) a first integrated circuit die having a first plurality of transmit block/receive block pairs, and (B) a second integrated circuit die having a second plurality of transmit block/receive block pairs, each respective transmit block and each respective receive block in (I) the first plurality of transmit block/receive block pairs on the first integrated circuit die, and (II) the second plurality of transmit block/receive block pairs on the second integrated circuit die, including respective digital clock generation circuitry; the method comprising:

outputting a digital clock signal from one respective receive block, in one plurality among (a) the first plurality of transmit block/receive block pairs on the first integrated circuit die and (b) the second plurality of transmit block/receive block pairs on the second integrated circuit die; and distributing the digital clock signal to the transmit blocks in both (1) the first plurality of transmit block/receive block pairs on the first integrated circuit die and (2) the second plurality of transmit block/receive block pairs on the second integrated circuit die, by transmitting the digital clock signal output by the one respective receive block via the digital clock distribution circuitry off the first integrated circuit die and onto both the first integrated circuit die and the second integrated circuit die, for use as a baseline clock by the respective digital clock generation circuitry in each of the transmit blocks in both (i) the first plurality of transmit block/receive block pairs on the first integrated circuit die and (ii) the second plurality of transmit block/receive block pairs on the second integrated circuit die.

21. The method according to claim 20 for clocking a multi-lane integrated circuit transceiver device, further comprising combining the N transmit block/receive block pairs on the first integrated circuit die and the N transmit block/receive block pairs on the second integrated circuit die to form a multi-lane integrated circuit transceiver device comprising 2N lanes.

22. The method according to claim 21 for clocking a multi-lane integrated circuit transceiver device, comprising:

operating the first integrated circuit die as a primary integrated circuit die having no more than N transmit block/receive block pairs forming a first group of transmit block/receive block pairs;

operating the second integrated circuit die as a secondary integrated circuit die having no more than N transmit block/receive block pairs forming a second group of transmit block/receive block pairs, so that the first integrated circuit die and the second integrated circuit die together form a single 2N-lane transceiver.

23. The method according to claim 21 for clocking a multi-lane integrated circuit transceiver device, where the first integrated circuit die and the second integrated circuit die are identical, each comprising 2N transmit block/receive block pairs; the method comprising:

transmitting the digital clock distribution circuitry on the first integrated circuit die and the second integrated circuit die to transmitting the digital clock signal output by a first respective receive block, the digital clock distribution circuitry on the first integrated circuit die and the second integrated circuit die, off one of the first integrated circuit die and the second integrated circuit die, and onto both the first integrated circuit die and the second integrated circuit die, for sharing by a first group of transmit block/receive block pairs including N transmit block/receive block pairs on the first integrated circuit die and N transmit block/receive block pairs on the second integrated circuit die, and transmitting the digital clock signal output by a second respective receive block, via the digital clock distribution circuitry on the first integrated circuit die and the second integrated circuit die, off one of the first integrated circuit die and the second integrated circuit die, and onto both the first integrated circuit die and the second integrated circuit die, for sharing by a second group of transmit block/receive block pairs including N transmit block/receive block pairs on the first integrated circuit die and N transmit block/receive block pairs on the second integrated circuit die; wherein:

the first group of transmit block/receive block pairs including N transmit block/receive block pairs on the first integrated circuit die and N transmit block/receive block pairs on the second integrated circuit die forms a first 2N-lane transceiver, and the second group of transmit block/receive block pairs including N transmit block/receive block pairs on the first integrated circuit die and N transmit block/receive block pairs on the second integrated circuit die form a second 2N-lane transceiver.

24. The method according to claim 20 for clocking a multi-lane integrated circuit transceiver device, where the respective digital clock generation circuitry includes oscillator circuitry, the method comprising:

comparing, in digital control circuitry, output of the digital clock generation circuitry to the baseline clock; and outputting, from the digital control circuitry, digital control signals to control the oscillator circuitry.

25. The method according to claim 24 for clocking a multi-lane integrated circuit transceiver device, where the oscillator circuitry includes analog phase-locked loop circuitry including, in series, a phase detector, a charge pump, a loop filter and an oscillator, and further includes a feedback divider, and a fractional modulator that controls a divisor of the feedback divider; wherein:

outputting, from the digital control circuitry, digital control signals to control the oscillator circuitry comprises outputting, from the digital control circuitry, digital control signals to control the fractional modulator.

26. The method according to claim 25 for clocking a multi-lane integrated circuit transceiver device, wherein outputting, from the digital control circuitry, control signals to control the fractional modulator, comprises outputting, from the digital control circuitry, control signals for the fractional modulator to dynamically control the divisor of the feedback divider.

* * * * *